(12) United States Patent
Lee et al.

(10) Patent No.: US 8,511,708 B2
(45) Date of Patent: Aug. 20, 2013

(54) PASSENGER AIRBAG MODULE

(75) Inventors: Bum Soo Lee, Yeongdeungpo-gu (KR); Jae-Man Ko, Osan-si (KR)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 13/286,798

(22) Filed: Nov. 1, 2011

(65) Prior Publication Data
US 2012/0104733 A1 May 3, 2012

(30) Foreign Application Priority Data

Nov. 2, 2010 (KR) .......................... 10-2010-0108187

(51) Int. Cl.
*B60R 21/2338* (2011.01)
*B60R 21/233* (2006.01)
*B60R 21/2346* (2011.01)

(52) U.S. Cl.
USPC ......... 280/729; 280/732; 280/740; 280/743.2

(58) Field of Classification Search
USPC .............. 280/729, 732, 743.2, 740, 742, 741, 280/731
See application file for complete search history.

(56) References Cited

U.S. PATENT DOCUMENTS

| | | | | |
|---|---|---|---|---|
| 5,957,485 A * | 9/1999 | Hirai | ............................. | 280/729 |
| 6,478,331 B1 * | 11/2002 | Lang | ............................. | 280/740 |
| 6,523,855 B2 * | 2/2003 | Musiol et al. | ................. | 280/729 |
| 6,612,609 B1 * | 9/2003 | Rodriguez et al. | ............ | 280/729 |
| 6,648,366 B2 * | 11/2003 | Dillon et al. | ................... | 280/729 |
| 7,073,818 B2 * | 7/2006 | Hasebe | ......................... | 280/729 |
| 7,422,237 B2 * | 9/2008 | Kai et al. | ....................... | 280/740 |
| 7,954,844 B2 * | 6/2011 | Kamiyama | .................... | 280/729 |
| 8,181,990 B2 * | 5/2012 | Maripudi | ................... | 280/743.2 |
| 8,282,122 B2 * | 10/2012 | Marable et al. | ............... | 280/729 |
| 2006/0202450 A1 * | 9/2006 | Madasamy et al. | ........... | 280/729 |
| 2007/0024043 A1 * | 2/2007 | Abe | ........................... | 280/743.2 |
| 2007/0108753 A1 * | 5/2007 | Pang et al. | ................. | 280/743.2 |

FOREIGN PATENT DOCUMENTS

EP 593172 A1 * 4/1994
JP 07-025303 1/1995

* cited by examiner

*Primary Examiner* — Ruth Ilan
*Assistant Examiner* — Darlene P Condra
(74) *Attorney, Agent, or Firm* — Harness, Dickey & Pierce, P.L.C.

(57) ABSTRACT

A passenger airbag module includes a housing, an inflator generating gas pressure according to a control signal of an electronic control unit, and an airbag cushion folded in the housing such that the airbag cushion is expanded in the form of a dual chamber. The airbag cushion is provided therein with a tether having a rectangular shape corresponding to a sectional shape of the airbag cushion. The tether is installed in the transverse direction to divide the airbag cushion into an upper chamber and a lower chamber. Transfer holes are formed at edges of the tether. In the passenger airbag module, the upper chamber is primarily expanded by concentrating gas flow into the upper chamber to instantly deploy the airbag cushion in the proper position, thereby safely protecting the occupants.

11 Claims, 4 Drawing Sheets

PASSENGER AIRBAG MODULE

CROSS-REFERENCE TO RELATED APPLICATIONS

This application claims the benefit and priority of Korean Patent Application KR 10-2010-0108187, filed Nov. 2, 2010. The entire disclosure of the above application is incorporated herein by reference.

FIELD

The present invention relates to a passenger airbag module. More particularly, the present invention relates to a passenger airbag module, which can instantly deploy an airbag in a predetermined deployment position upon vehicle collision, thereby safely protecting an occupant seated in a passenger seat.

BACKGROUND

This section provides background information related to the present disclosure which is not necessarily prior art.

In general, an airbag module and a seat belt device are installed in a vehicle to protect drivers and passengers upon vehicle collision.

The airbag module is installed at a driver seat and a passenger seat of the vehicle and instantly expanded upon the vehicle collision to protect the heads and chests of the occupants.

If rear-side collision, side collision or head-on collision occurs in the vehicle running in a predetermined speed, an inflator of a passenger airbag module is exploded while generating gas pressure, so that an airbag cushion is expanded to prevent the passenger from directly colliding with internal structures of the vehicle, thereby minimizing the bodily injury.

In detail, as the rear-side collision or the head-on collision of the vehicle is detected by an impact sensor of the passenger airbag module, an explosive igniter and a gas generator installed in an inflator housing are sequentially ignited, so that high-pressure gas is generated. Thus, the airbag cushion folded in multiple steps is deployed toward the passenger while tearing an airbag cover, thereby preventing the passenger from colliding with the interior structures of the vehicle.

An example of the passenger airbag modules is disclosed in Japanese Unexamined Patent Publication No. 1995-025303 published on Jan. 27, 1995 (hereinafter, referred to as patent document 1).

FIG. 1 schematically shows the deployment state of a passenger airbag cushion disclosed in patent document 1.

As shown in FIG. 1, an airbag device according to patent document 1 includes a bag body 5 having an outer bag 7 provided therein with inflators 6 and an inner bag 8 branching from the outer bag 7 to support the external shape of the bag body 5. The inner bag 8 includes a plurality of branch sections 8 extending to a rear side of the bag body 5 along an inner surface of the bag body 5. An air hole 5a is formed in the bag body 5 to communicate with the outside.

According to the airbag device of patent document 1, the inner bag 8 formed in the bag body 5 is primarily expanded and deployed due to gas pressure generated from the inflators 6 when the airbag is deployed.

In detail, the airbag device according to patent document 1 primary expands and deploys the inner bag 8 having a volume remarkably smaller than that of the bag body 5 and then expands and deploys the bag body 5 by using air introduced through the air hole 5a, so the bag body 5 can be instantly expanded and deployed. Therefore, the airbag device according to patent document 1 can safely protect the occupants by reliably restraining the occupants.

However, the airbag device according to patent document 1 must form the inner bag 8 including the branch sections 9 in the bag body 5, so the process for manufacturing the bag body 5 and the inner bag 8 may be complicated, so that the manufacturing cost for the airbag device may be increased.

CITED DOCUMENTS (Patent document 1) Japanese Unexamined Patent Publication No. 1995-025303 published on Jan. 27, 1995.

SUMMARY

This section provides a general summary of the disclosure, and is not a comprehensive disclosure of its full scope or all of its features.

The present invention has been made to solve the problems occurring in the related art, and an object of the present invention is to provide a passenger airbag module, capable of safely protecting an occupant seated in a passenger seat by instantly deploying an airbag upon vehicle collision.

Another object of the present invention is to provide a passenger airbag module, in which an airbag cushion is prepared in the form of a dual chamber in such a manner that the airbag cushion can be deployed in a predetermined speed at a predetermined deployment position.

In order to accomplish the above objects, according to the present invention, there is provided a passenger airbag module including a housing facing an occupant seated in a passenger seat of a vehicle, an inflator fixed to a lower portion of the housing to generate gas pressure according to a control signal transmitted from an electronic control unit, and an airbag cushion folded in the housing in such a manner that the airbag cushion is expanded in a form of a dual chamber by the gas pressure generated from the inflator. The airbag cushion is provided therein with a tether having a rectangular shape corresponding to a sectional shape of the airbag cushion. The tether includes a material identical to a material of the airbag cushion and is installed in a transverse direction to divide the airbag cushion into an upper chamber and a lower chamber. The transfer holes are formed at edges of the tether to transfer gas pressure from the upper chamber to the lower chamber in correspondence with gas pressure variation.

According to the present invention, the airbag cushion includes a main wall and sidewalls constituting both side surfaces of the main wall, and the tether is stitched to central portions of the main wall and the sidewalls such that the tether is positioned corresponding to a chin of the occupant when the airbag cushion is deployed.

According to the present invention, the transfer holes are formed at corners of the tether where the main wall meets the sidewalls.

As described above, according to the present invention, the upper chamber is primarily expanded by concentrating the gas flow into the upper chamber to instantly deploy the airbag cushion in the proper position, thereby safely protecting the occupants.

In addition, according to the present invention, the upper chamber of the airbag cushion corresponding to the head of the occupant is instantly deployed to protect the head of the occupant, and then the lower chamber is deployed to protect the chest of the occupant.

Further, according to the present invention, when the airbag cushion is deployed, the front center portion of the airbag cushion corresponding to the chin of the occupant is recessed by the tether that divides the airbag cushion into the upper and lower chambers, so that the occupant can be prevented from being damaged caused by the excessive deployment pressure of the airbag cushion.

In addition, according to the present invention, the tether is installed corresponding to the chin of the occupant, so that the neck of the occupant may not be damaged by the deployment pressure of the airbag cushion.

Further areas of applicability will become apparent from the description provided herein. The description and specific examples in this summary are intended for purposes of illustration only and are not intended to limit the scope of the present disclosure.

BRIEF DESCRIPTION OF DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Hereinafter, a passenger airbag module and a method of deploying an airbag of the passenger airbag module according to the exemplary embodiments of the present invention will be described in detail with reference to accompanying drawings.

Figure 1:
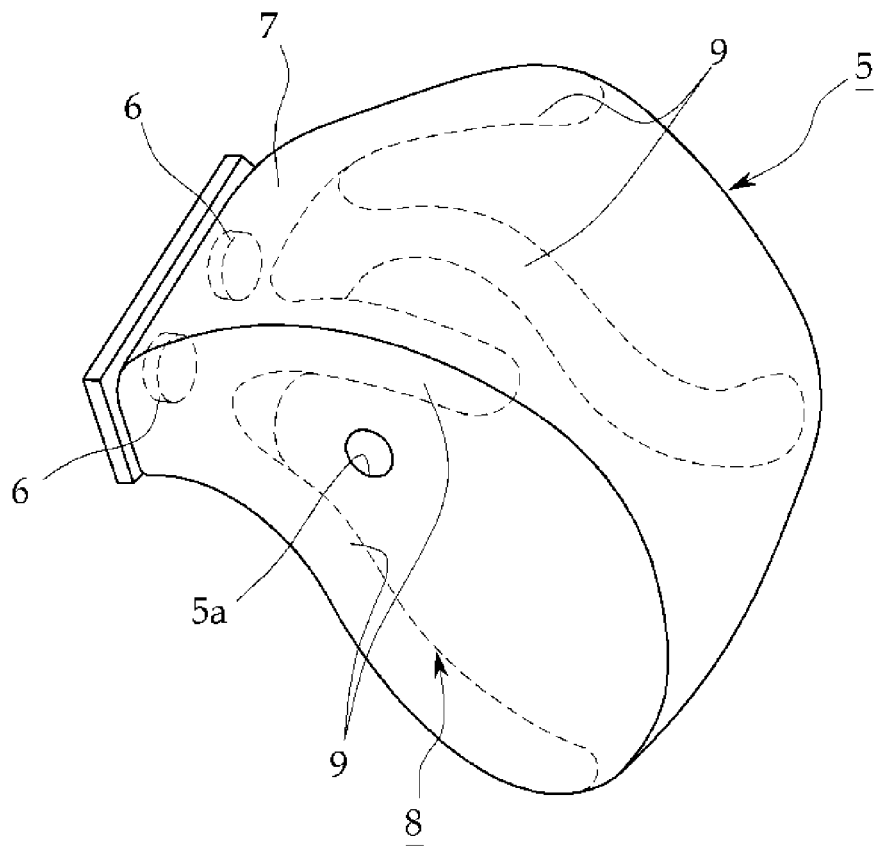
FIG. 1 is a perspective view showing a deployment state of a passenger airbag cushion according to the related art.
Figure 2:
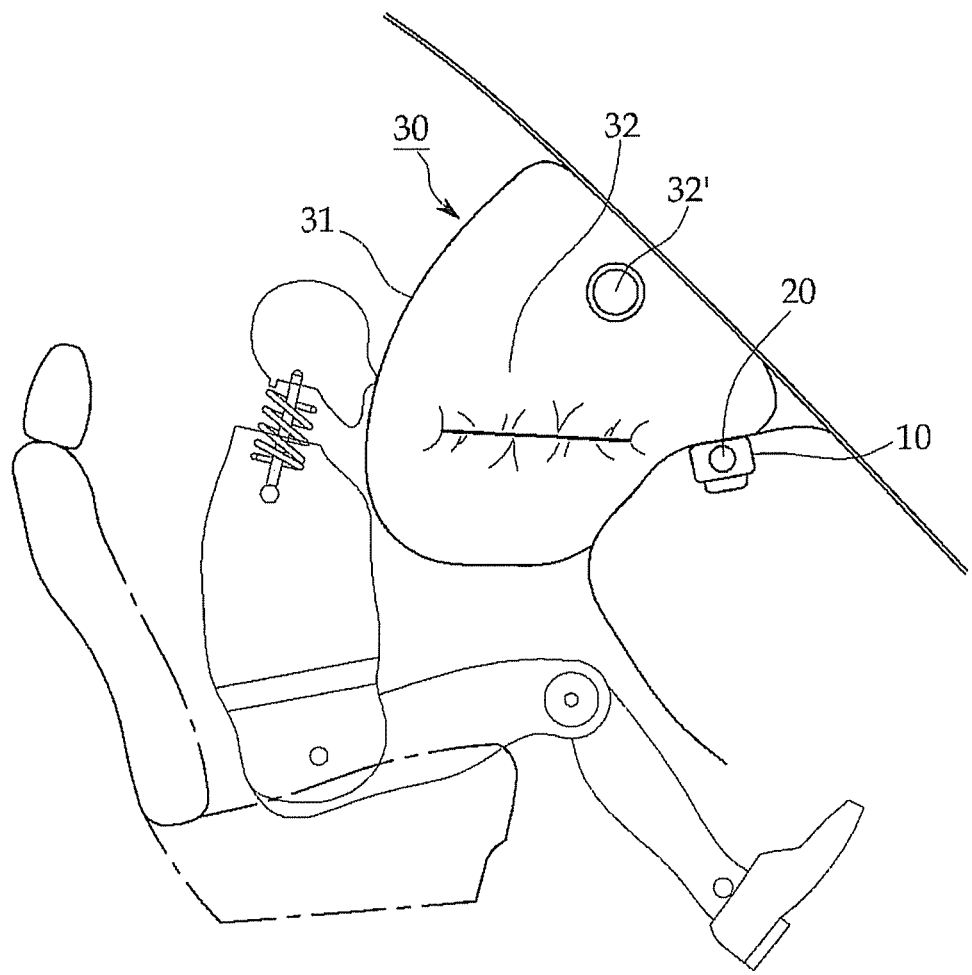
FIG. 2 is a schematic view showing a deployment state of an airbag cushion of a passenger airbag module according to one embodiment of the present invention.
Figure 3:
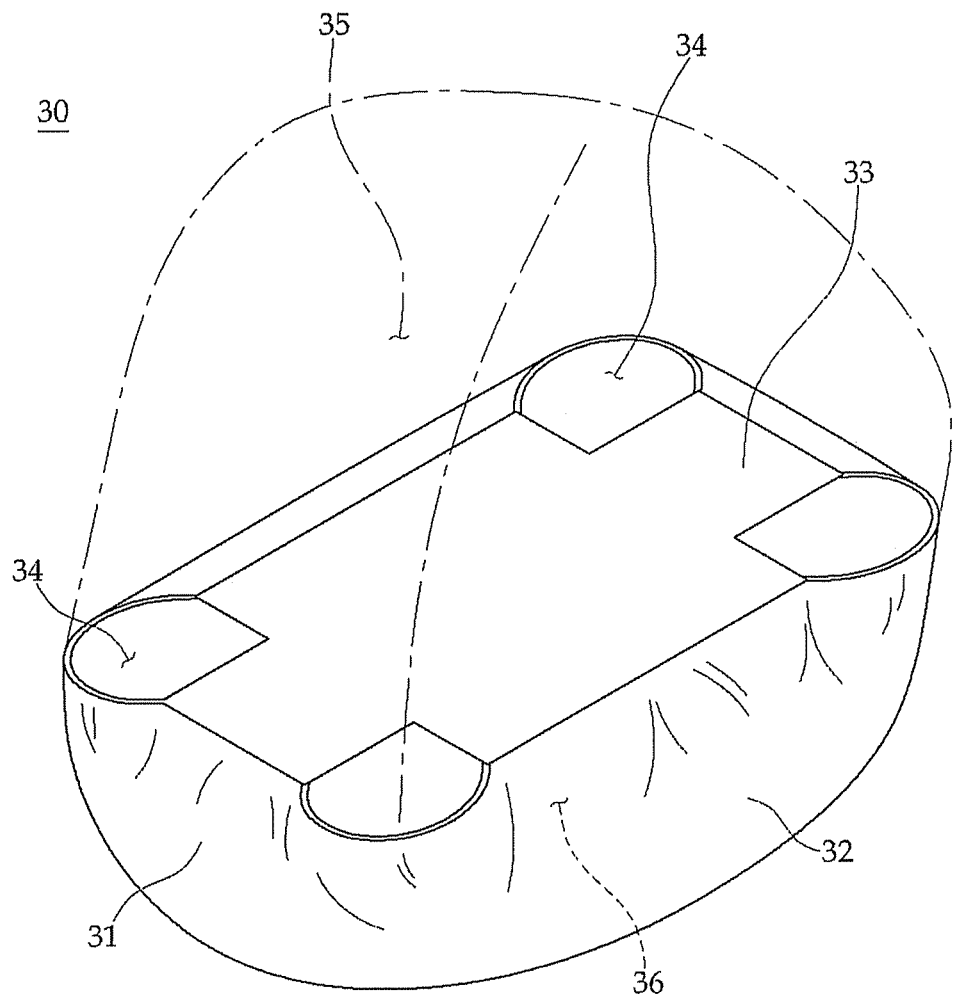
FIG. 3 is a sectional perspective view showing an airbag cushion illustrated in FIG. 2.
Figure 4:
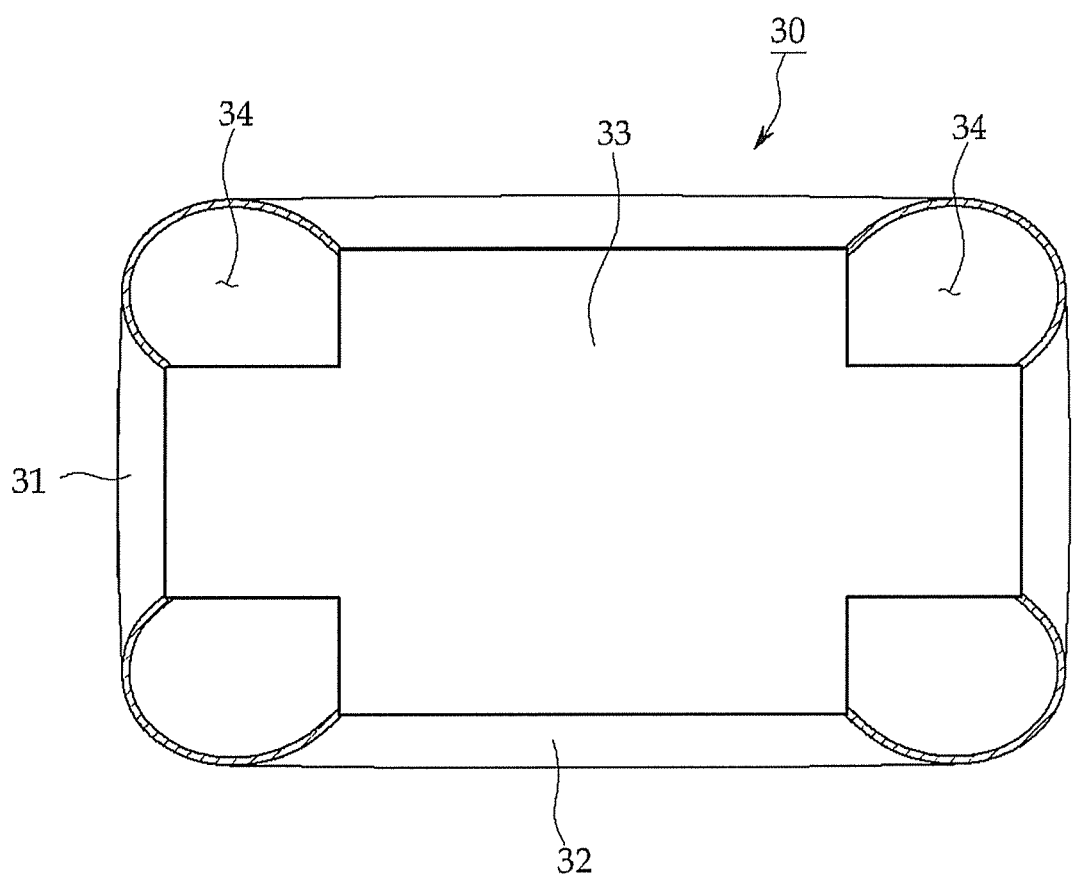
FIG. 4 is a plan view showing a tether illustrated in FIG. 3.

FIG. 2 is a schematic view showing a deployment state of an airbag cushion of a passenger airbag module obtained from a simulator according to one embodiment of the present invention, FIG. 3 is a sectional perspective view showing the airbag cushion illustrated in FIG. 2, and FIG. 4 is a plan view showing a tether illustrated in FIG. 3.

As shown in FIG. 2, the passenger airbag module according to the exemplary embodiment of the present invention includes a housing 10 facing an occupant seated in a passenger seat of a vehicle, an inflator 20 fixed to a lower portion of the housing 10 to generate gas pressure according to a control signal transmitted from an electronic control unit (not shown), and an airbag cushion 30 folded in the housing 10 in such a manner that the airbag cushion 30 can be expanded by the gas pressure generated from the inflator 20.

A lower portion and both lateral sides of the housing 10 are fixed to a dash panel, which is disposed between an engine room and an interior of the vehicle, by a fixing unit.

The inflator 20 is electrically connected to the electronic control unit to generate the gas pressure by exploding an explosive accommodated therein according to the control signal of the electric control unit upon the vehicle collision.

The airbag cushion 30 is expanded by the gas pressure generated from the inflator 20 to safely protect the occupant by restraining the occupant.

In more detail, as shown in FIGS. 2 to 4, the airbag cushion 30 includes a main wall 31 and sidewalls 32 constituting both side surfaces of the main wall 31. In addition, a tether 33 is provided in the airbag cushion 30 to divide the interior of the airbag cushion 30 in the transverse direction such that the airbag cushion 30 can be expanded in the form of a dual chamber by the gas pressure generated from the inflator 20.

In addition, a drain port 32' is formed at the sidewalls 32 of the airbag cushion 30 to prevent the occupant from being subject to the excessive expansion pressure by draining the gas out of the airbag cushion 30.

As shown in FIG. 3, the tether 33 is a partition plate that divides the interior of the airbag cushion 30 into an upper chamber 35 and a lower chamber 36. The tether 33 has a predetermined shape corresponding to the sectional shape of the airbag cushion 30 and is made from a flexible material identical to a material of the airbag cushion 30, so the tether 33 can be freely folded and warped. The tether 33 is stitched to central portions of the main wall 31 and the sidewalls 32.

As shown in FIG. 4, the tether has a substantially rectangular shape and transfer holes 34 are formed at edges of the tether 33 to transfer the gas pressure of the inflator 20 from the upper chamber 35 to the lower chamber 36 in correspondence with the pressure variation in the upper chamber 35.

In particular, as shown in FIG. 4, the transfer holes 34 are preferably formed at corners of the tether 33 where the main wall 31 meets the sidewalls 32.

Accordingly, the upper chamber 35 is primarily expanded by concentrating the gas flow into the upper chamber 35 to instantly deploy the airbag cushion 30 in the proper position, thereby safely protecting the occupants.

Meanwhile, as shown in FIG. 2, the tether 33 is preferably located corresponding to the chin of the occupant when the airbag cushion 30 is deployed.

In this case, the chin of the occupant makes contact with the recess part of the airbag cushion 30 defined by the tether 33 when the airbag cushion 30 is deployed. Thus, when the head of the occupant makes contact with the airbag cushion 30, the neck of the occupant may not be pulled back, so that the neck injury of the occupant can be prevented.

Therefore, according to the present invention, when the airbag cushion is deployed, the front center portion of the airbag cushion corresponding to the chin of the occupant is recessed by the tether that divides the airbag cushion into the upper and lower chambers, so that the occupant can be prevented from being damaged caused by the excessive deployment pressure of the airbag cushion.

Hereinafter, a method of deploying the airbag of the passenger airbag module according to the exemplary embodiment of the present invention will be described in detail.

When the vehicle running in a predetermined speed is subject to the head-on collision or the rear-end collision, the electronic control unit transmits the control signal to the inflator 20 to generate the gas pressure.

Upon receiving the control signal from the electronic control signal, the inflator 20 explodes the explosive accommodated in the inflator 20, thereby generating the gas pressure.

The gas pressure generated from the inflator 20 is transferred to the airbag cushion 30.

Thus, the airbag cushion 30 is expanded by the gas pressure supplied from the inflator 20. At this time, the upper chamber 35 is primarily expanded and then the lower chamber 36 is expanded by receiving the gas pressure through the transfer holes formed at edges of the tether 33.

That is, according to the present invention, the upper chamber of the airbag cushion corresponding to the head of the occupant is instantly deployed to protect the head of the occupant, and then the lower chamber is deployed to protect the chest of the of the occupant.

As described above, according to the present invention, the upper chamber is primarily expanded by concentrating the gas flow into the upper chamber to instantly deploy the airbag cushion in the proper position, thereby safely protecting the occupants.

Although the exemplary embodiments of the present invention has been described for illustrative purposes, those skilled in the art will appreciate that various modifications, additions and substitutions are possible, without departing from the scope and spirit of the invention as disclosed in the accompanying claims.

For instance, although the embodiments have been described with reference to the passenger airbag module, the present invention is also applicable for the driver airbag module.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An airbag module comprising:
a housing for facing an occupant seated in a passenger seat of a vehicle;
an inflator fixed to a lower portion of the housing to generate gas pressure according to a control signal transmitted from an electronic control unit;
an airbag cushion folded in the housing in such a manner that the airbag cushion is expanded in a form of a dual chamber by the gas pressure generated from the inflator, the airbag cushion including a main wall and a pair of side walls; and
a tether provided in the airbag having a rectangular shape corresponding to a sectional shape of the airbag cushion, the tether installed in a transverse direction to divide the airbag cushion into an upper chamber and a lower chamber, the tether including transfer holes formed at edges of the tether to transfer gas pressure from the upper chamber to the lower chamber in correspondence with gas pressure variation, the transfer holes are formed at corners of the tether such that the transfer holes extend to an external wall of the airbag cushion;
wherein the inflator is in communication with the upper chamber for directly inflating the upper chamber and indirectly inflating the lower chamber through the transfer holes such that the lower chamber is deployed from the corners; and
wherein each of the transfer holes is formed at an intersection of the main wall and one of the pair of side walls.

2. The airbag module of claim 1, wherein the tether is stitched to central portions of the main wall and the side wall.

3. The airbag module of claim 1, wherein the tether is rectangular having first and second tether sides secured to the pair of side walls that are substantially greater in length than first and second ends secured to the main wall.

4. The airbag module of claim 1, wherein the tether includes four corners and a transfer hole is formed at each of the four corners.

5. The airbag module of claim 1, wherein upon inflation of the airbag cushion each transfer hole is defined by first and second linear sides and an arcuate portion of the external wall of the airbag cushion connecting the linear sides.

6. The airbag module of claim 1, wherein the airbag cushion consists of the main wall and the pair of side walls.

7. An airbag module comprising:
a housing;
an inflator fixed to the housing for generating gas pressure;
an airbag cushion folded in the housing in such a manner that the airbag cushion is expanded in a form of a dual chamber by the gas pressure generated from the inflator; and
a tether provided in the airbag having a rectangular shape with four corners, the tether corresponding to a sectional shape of the airbag cushion and installed in a transverse direction to divide the airbag cushion into an upper chamber and a lower chamber, the tether including transfer holes formed at each of the four corners for transferring gas pressure from the upper chamber to the lower chamber;
wherein the tether is secured to an external wall of the airbag cushion; and
wherein the airbag cushion includes a main wall and a pair of side walls and further wherein each of the transfer holes is formed at an intersection of the main wall and one of the pair of side walls.

8. The airbag module of claim 7, wherein each transfer hole is defined by a pair of linear edges of the tether and an arcuate portion of the airbag cushion when the cushion is inflated.

9. The airbag module of claim 7, wherein the airbag cushion consists of the main wall and the pair of side walls.

10. An airbag module comprising:
a housing;
an inflator fixed to the housing for generating gas pressure;
an airbag cushion folded in the housing in such a manner that the airbag cushion is expanded in a form of a dual chamber by the gas pressure generated from the inflator, the airbag cushion including a pair of side walls and a main wall; and
a tether provided in the airbag having a rectangular shape with four corners, the tether corresponding to a sectional shape of the airbag cushion and installed in a transverse direction to divide the airbag cushion into an upper chamber and a lower chamber, the tether including transfer holes formed at each of the four corners for transferring gas pressure from the upper chamber to the lower chamber;
wherein the tether is secured to an external wall of the airbag cushion; and
wherein the tether is rectangular having first and second tether sides secured to the pair of side walls that are substantially greater in length than first and second ends secured to the main wall.

11. An airbag comprising:
a cushion consisting of a main panel and first and second side panels;
the main panel defining a top surface, a bottom surface and a forward surface, the first and second side panels secured to the main panel; and
a rectangular tether including first and second lateral sides, a front side, a rear side, and four corners, the tether dividing the cushion into an upper chamber and a lower chamber, the first and second lateral sides secured to the first and second side panels, respectively, the front and rear sides secured to the main panel, the tether cutaway at each of the four corners to define transfer holes between the upper and lower chambers, the transfer holes each defined in part by a respective pair of linear edges of the tether;

wherein the inflator is in communication with the upper chamber for directly inflating the upper chamber and indirectly inflating the lower chamber through the transfer holes such that the lower chamber is deployed from the corners; and wherein each of the transfer holes is formed at an intersection of the main panel and one of the pair of side walls.

* * * * *